United States Patent [19]
Wehner

[11] Patent Number: 6,084,013
[45] Date of Patent: Jul. 4, 2000

[54] STABILIZER SYSTEM FOR CHLORINE-CONTAINING POLYMERS

[75] Inventor: Wolfgang Wehner, Zwingenberg, Germany

[73] Assignee: Witco Vinyl Additives GmbH, Lampertheim, Germany

[21] Appl. No.: 09/232,892

[22] Filed: Jan. 15, 1999

[30] Foreign Application Priority Data

Jan. 16, 1998 [CH] Switzerland ............................ 0078/98

[51] Int. Cl.[7] .............................. C08K 3/10; C08K 3/26; C08K 3/32; C08K 5/34
[52] U.S. Cl. .......................... 524/100; 524/414; 524/425; 524/434; 524/436; 524/437
[58] Field of Search .................................... 524/100, 414, 524/425, 434, 436, 437

[56] References Cited

U.S. PATENT DOCUMENTS

| | | |
|---|---|---|
| 3,243,394 | 3/1966 | Dietz et al. . |
| 3,436,362 | 4/1969 | Hayer et al. . |
| 3,912,671 | 10/1975 | Kondo et al. . |
| 4,060,512 | 11/1977 | Scheidl et al. . |
| 4,197,209 | 4/1980 | Zinke et al. . |
| 4,639,482 | 1/1987 | Muller et al. . |
| 4,743,640 | 5/1988 | Wirth et al. . |
| 5,030,671 | 7/1991 | Wehner et al. . |
| 5,298,545 | 3/1994 | Razvan et al. . |
| 5,516,827 | 5/1996 | Kaufhold et al. . |
| 5,925,696 | 7/1999 | Wehner et al. ........................ 524/100 |

FOREIGN PATENT DOCUMENTS

| | | |
|---|---|---|
| 2195245 | 2/1996 | Canada . |
| 0 041 479 | 12/1981 | European Pat. Off. . |
| 0 065 934 | 12/1982 | European Pat. Off. . |
| 0 090 748 | 11/1986 | European Pat. Off. . |
| 0 108 023 | 12/1986 | European Pat. Off. . |
| 0 225 261 | 6/1987 | European Pat. Off. . |
| 0 394 547 | 10/1990 | European Pat. Off. . |
| 0 259 783 | 1/1994 | European Pat. Off. . |
| 0 768 336 | 11/1995 | European Pat. Off. . |
| 0 506 617 | 8/1996 | European Pat. Off. . |
| 0 457 471 | 1/1997 | European Pat. Off. . |
| 0 761 756 | 3/1997 | European Pat. Off. . |
| 2 459 816 | 6/1979 | France . |
| 2 552 440 | 9/1983 | France . |
| 40 31 818 | 4/1992 | Germany . |
| 42 04 887 | 8/1993 | Germany . |
| 44 25 275 | 1/1996 | Germany . |
| WO 92/13914 | 8/1992 | WIPO . |
| WO 93/25613 | 12/1993 | WIPO . |
| WO 94/24200 | 10/1994 | WIPO . |

*Primary Examiner*—Kriellion Sanders
*Attorney, Agent, or Firm*—Scully, Scott, Murphy & Presser

[57] ABSTRACT

A description is given of stabilizer combinations comprising
A) at least one compound of the formula I

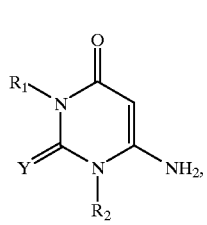

(I)

in which
  $R_1$ and $R_2$ independently of one another are $C_1$–$C_{12}$-alkyl, $C_3$–$C_6$-alkenyl, $C_5$–$C_8$-cycloalkyl which is unsubstituted or substituted by 1 to 3 $C_1$–$C_4$-alkyl-, $C_1$–$C_4$-alkoxy-, $C_5$–$C_8$-cycloalkyl or hydroxyl groups or chlorine atoms, or are $C_7$–$C_9$-phenylalkyl which is unsubstituted or substituted on the phenyl ring by 1 to 3 $C_1$–$C_4$-alkyl, $C_1$–$C_4$-alkoxy, $C_5$–$C_8$-cycloalkyl or hydroxyl groups or chlorine atoms, and
  $R_1$ and $R_2$ can additionally be hydrogen, and
  Y is S or O, and
B) at least one compound from the group of the calcium aluminum hydroxides and/or their hydrates and/or
C) at least one compound from the group of the calcium aluminum hydrogen phosphites and/or their hydrates and/or
D) at least one compound of the group of the aluminum hydroxides and/or their hydrates and/or
E) at least one compound from the group of the calcium aluminum hydroxo (hydrogen) carbonates and/or their hydrates and/or
F) at least one compound from the group of the lithium layered lattice compounds and/or their hydrates and/or
G) at least one compound from the group of the titanium-containing hydrotalcites and/or their hydrates
which are suitable for stabilizing chlorine-containing polymers, especially PVC.

11 Claims, No Drawings

STABILIZER SYSTEM FOR CHLORINE-CONTAINING POLYMERS

The invention relates to stabilizer combinations comprising a compound of the formula I as shown below and at least one further substance from the groups of the calcium aluminum hydroxides and/or the calcium aluminum hydroxo hydrogen phosphites and/or calcium aluminum hydroxo (hydrogen) carbonates and their hydrates and/or the aluminum hydroxides and/or lithium layered lattice compounds, which are suitable for stabilizing chlorine-containing polymers, especially PVC.

PVC can be stabilized by a range of additives. Compounds of lead, barium and cadmium are particularly suitable for this purpose, but are nowadays contraversial on ecological grounds or owing to their heavy metal content (cf. "Kunstoffadditive" [Plastics additives], R. Gächter/H. Müller, Carl Hanser Verlag, 3rd Ed., 1989, pages 303–311, and "Kunststoff Handbuch PVC" [Plastics Handbook PVC], Volume 2/1, W. Becker/D. Braun, Carl Hanser Verlag, 2nd Ed., 1985, pages 531–538; and Kirk-Othmer: "Encyclopedia of Chemical Technology", 4$^{th}$ Ed., 1994, Vol. 12, Heat Stabilizers, pp. 1071–1091). The search therefore continues for effective stabilizers and stabilizer combinations which are free from lead, barium and cadmium.

Compounds of the formula I have already been described in DE-A-1 694 873, EP-A-0 065 934, EP-A-0 041 479 and EP-A-0 768 336 and can be prepared by known methods in one or more process steps.

The stabilization of chlorine-containing polymers, especially PVC, by means of hydrocalumites, katoites and calcium aluminum hydroxo hydrogen phosphites is known from WO 92/13914, WO 93/25613, DE 3 941 902 and DE 4 106 411.

The stabilizing effect of lithium layered lattice compounds on PVC is described, for example, in EP-A-0 761 756 and in DE-A-4 425 275. A stabilizing action of titanium-containing hydrotalcites is evident from WO 95/21127.

It has now been found that stabilizer combinations comprising

A) at least one compound of the formula I

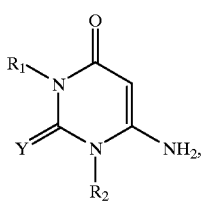

(I)

in which $R_1$ and $R_2$ independently of one another are $C_1$–$C_{12}$-alkyl, $C_3$–$C_6$-alkenyl, $C_5$–$C_8$-cycloalkyl which is unsubstituted or substituted by 1 to 3 $C_1$–$C_4$-alkyl-, $C_1$–$C_4$-alkoxy-, $C_5$–$C_8$-cycloalkyl or hydroxyl groups or chlorine atoms, or are $C_7$–$C_9$-phenylalkyl which is unsubstituted or substituted on the phenyl ring by 1 to 3 $C_1$–$C_4$-alkyl, $C_1$–$C_4$-alkoxy, $C_5$–$C_8$-cycloalkyl or hydroxyl groups or chlorine atoms, and $R_1$ or $R_2$ can additionally be hydrogen, and Y is S or O, and B) at least one compound from the group of the calcium aluminum hydroxides and/or their hydrates and/or C) at least one compound from the group of the calcium aluminum hydroxo hydrogen phosphites and/or their hydrates and/or D) at least one compound of the group of the aluminum hydroxides and/or their hydrates and/or E) at least one compound from the group of the calcium aluminum hydroxo (hydrogen) carbonates and/or their hydrates and/or F) at least one compound from the group of the lithium layered lattice compounds and/or their hydrates and/or G) at least one compound from the group of the titanium-containing hydrotalcites and/or their hydrates are particularly suitable for stabilizing PVC, for example.

Combinations of A) and B), A) and C), A) and D), A) and E), A) and F), A) and B) and C) and A) and B) and C) and D), with perchlorate compounds and/or polyols and/or glycidyl compounds constitute a further constituent of the invention.

In this context, for compounds of the formula I:

$C_1$–$C_4$-Alkyl is for example methyl, ethyl, n-propyl, iso-propyl, n-, i-, sec- or t-butyl.

$C_1$–$C_{12}$-Alkyl is for example the radicals just mentioned plus pentyl, hexyl, heptyl, octyl, 2-ethylhexyl, i-octyl, decyl, nonyl, undecyl or dodecyl.

$C_1$–$C_4$-Alkoxy is for example methoxy, ethoxy, propoxy, isopropoxy, butoxy or isobutoxy.

$C_5$–$C_8$-Cycloalkyl is for example cyclopentyl, cyclohexyl, cycloheptyl or cyclooctyl.

$C_7$–$C_9$-Phenylalkyl is for example benzyl, 1- or 2-phenylethyl, 3-phenylpropyl, α,α-dimethylbenzyl or 2-phenylisopropyl, preferably benzyl. If the cycloalkyl groups or the phenyl group of the phenylalkyl radicals are substituted then they preferably have two or one substituent, the substituents being above all chlorine, hydroxyl, methyl or methoxy.

$C_3$–$C_6$-Alkenyl is for example vinyl, allyl, methallyl, 1-butenyl or 1-hexenyl, preferably allyl.

Preference is given to compounds of the formula I, in which $R_1$ and $R_2$ independently of one another are $C_1$–$C_4$-alkyl and hydrogen. With particular preference, $R_1$ and $R_2$ are either identical and are methyl, ethyl, propyl, butyl or allyl or are different and are ethyl and allyl.

To stabilize the chlorine-containing polymer, the compounds of components A) should judiciously be used in a proportion of from 0.01 to 10% by weight, preferably from 0.05 to 5% by weight and, in particular, from 0.1 to 3% by weight.

The compounds of the groups specified under B) are described generally in "Ullmann's Encyclopedia of Industrial Chemistry" (5th Edition, 1986): Vol. A5 —Cement and Concrete (p. 505 ff.); Kirk-Othmer "Encyclopedia of Chemical Technology" (4th Edition, 1993): Vol. 5 —Cement (p. 572 ff.); P. Barnes "Structure and Performance of Cements" (Appl. Sci. Publ. N. Y., 1983); F. M. Lea "The Chemistry of Cement and Concrete" (E. Arnold Publ. London, 1971); H. F. W. Taylor "Cement Chemistry" (Acad. Press, London, 1992)—Chap. 6: Hydrated aluminate phases (p. 167 ff.) and are elucidated by way of example as follows:

HYDROCALUMITES

Compounds suitable for the stabilizer combinations of the invention and hailing from the group of the hydrocalumites of the general formula

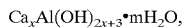

where x=1–4 and m=0–8, can be prepared, for example, by means of a process in which a sodium hydroxide solution is added to mixtures of water-soluble calcium salts and aluminum salts, in amounts appropriate to prepare the desired compounds, in an aqueous medium until a pH of about 10 is reached. In this process a suspension is formed from which the reaction product is conventionally separated off and obtained, for example, by filtration, washing and drying. In a preferred embodiment, a known stabilizer coating agent, such as stearic acid, is added to the suspension before the product is separated off. Such an agent improves the dispersibility of the hydrocalumites used in a stabilizer combination in the halogen-containing thermoplastic resins.

Preferred compounds are those in which, in the above general formula, x=2 or 3.

Katoites

Compounds suitable for the stabilizer combinations of the invention and hailing from the group of the katoites of the general formula

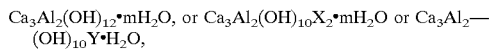

where m=0–10, X=monovalent or Y=divalent in organic or organic anion.

which may have been surface modified, have a very specific crystal lattice (known as the hydrogranate structure) which distinguishes them from other calcium aluminum hydroxy compounds. This crystal lattice, together with the lattice spacings, is described in the article by C. Cohen-Addad and P. Ducros in Acta Cryst. (1967), 23, pp 220 to 225. Accordingly, it comprises a cubic crystal lattice. The aluminum is surrounded octahedrally by six oxygens each of which also carries one hydrogen. The calcium is surrounded by 8 oxygens, forming a distorted cube which is also referred to as a triangular dodecahedron.

The katoites of the general formula $Ca_3Al_2(OH)_{12}$ can be prepared, for example, in accordance with German Patent DE 2 424 763 from the hydroxides of calcium and of aluminum in appropriate stoichiometric amounts in the aqueous system. Depending on the test temperatures and reaction times, they are obtained with different average particle diameters. Preference is given to temperatures in the range from 50 to 150° C. and reaction times from 0.1 to 9 hours. Under such conditions, the katoites are obtained with average particle diameters of from 01 to 100 µm, preferably rom 0.5 to 30 µm.

It is possible for small amounts of calcium-containing hydroxyaluminate (hydrocalumite) byproduct may be obtained, such compounds having a layer structure and being represented by the general formula described above.

In preparing the katoites it is also possible to employ excess amounts of aluminum hydroxide or calcium hydroxide, in which case mixtures of unreacted calcium and/or aluminum hydroxide and katoite are formed. These mixtures can also be used for the purposes of the invention. If desired, the katoites of the above formula can have been surface-modified with one or more additives selected from the following groups a) unalkoxylated or alkoxylated alcohols having one or more hydroxyl groups, b) partly or fully epoxidized unsaturated fatty acids, fatty alcohols, and/or derivatives thereof, c) full and partial esters of polyols having 3 to 30 carbon atoms and 2 to 6 hydroxyl groups with carboxylic acids having 6 to 22 carbon atoms, d) alkyl and aryl phosphites, e) homopolymers and copolymers of acrylic and methacrylic acid, f) lignin- and naphthalenesulfonates and/or trimeric fatty acids, g) salts of fatty acids.

Suitable additives in group a) include both monofunctional alcohols and polyols having 3 to 30 carbon atoms and 2 to 6 hydroxyl groups, which may be in alkoxylated—preferably ethoxylated—form. From the group of the monofunctional alcohols, preference is given to the use of fatty alcohols having 6 to 22 carbon atoms, such as capryl, lauryl, palmityl, stearyl, oleyl, linolyl, arachidyl and behenyl alcohols, and to their technical-grade mixtures as obtainable from natural oils and fats. Of these fatty alcohols, very particular preference is given to the use of the ethoxylated representatives with 2 to 15 mol of ethylene oxide. Suitable candidates from the group of the polyols are diols having 3 to 30 carbon atoms, such as butanediols, hexanediols, dodecanediols, and also trimethylolpropane, pentaerythritol, glycerol and their technical-grade oligomer mixtures with average degrees of condensation of from 2 to 10. From the polyols group, very particular preference is given to those having 3 to 30 carbon atoms and carrying at least one hydroxyl group or an ether oxygen for each 3 carbon atoms; preferably glycerol and/or the technical-grade oligoglycerol mixtures having average degrees of condensation of from 2 to 10.

The additives of group b) are partly or fully epoxidized unsaturated fatty acids or fatty alcohols having 6 to 22 carbon atoms or derivatives thereof. Particularly suitable derivatives of the epoxidized fatty acids or fatty alcohols are their esters, it being possible for the epoxidized fatty acids and epoxidized fatty alcohols to be esterified with one another or else with unepoxidized carboxylic acids or unepoxidized mono- or polyhydric alcohols. The epoxidized fatty acids are preferably derived from the unsaturated palmitoleic, oleic, elaidic, petroselic, ricinoleic, linolenic, gadoleic or erucic acids, which are fully or partly epoxidized by known techniques. The epoxidized fatty alcohols are preferably derived from the unsaturated alcohols oleyl, elaidyl, ricinoleyl, linoleyl, linolenyl, gadoleyl, arachidyl or erucyl alcohol, which are likewise fully or partly epoxidized by known techniques. Suitable esters of epoxidized fatty acids are esters of mono-, di- and/or trihydric alcohols esterified fully with epoxidized unsaturated carboxylic acids having 6 to 22 carbon atoms, such as the methyl, 2-ethylhexyl, ethylene glycol, butanediol, neopentyl glycol, glycerol and/or trimethylol propane esters of epoxidized lauroleic, palmitoleic, oleic, ricinoleic, linoleic and/or linolenic acids. Preference is given to esters of trihydric alcohols with almost fully epoxidized unsaturated carboxylic acids having 12 to 22 carbon atoms, and especially to esters of glycerol with almost fully epoxidized unsaturated carboxylic acids having 12 to 22 carbon atoms. As is conventional in the chemistry of fats, the epoxidized carboxylic glycerides can also constitute technical mixtures as obtained by epoxidation of natural unsaturated fats and unsaturated oils. Preference is given to the use of epoxidized rapeseed oil, epoxidized soybean oil and epoxidized sunflower oil from recent cultivation.

The additives of group c) comprise full or partial esters obtained by the relevant methods of preparative organic chemistry—for example by acid-catalyzed reaction of polyols with carboxylic acids. Suitable polyol compounds in this context are those already discussed in connection with group a). As the acid component it is preferred to employ aliphatic, saturated and/or unsaturated carboxylic acids having 6 to 22 carbon atoms, such as caproic, caprylic, capric, lauric, myristic, palmitic, palmitoleic, stearic, oleic, risinoleic, linoleic, linolenic, behenic or erucic acid. As is common in the chemistry of fats, the carboxylic acid may also constitute a technical mixture as obtained in the pressure cracking of natural fats and oils. Preference is given to partial esters of glycerol and, in particular, to partial esters of technical-grade mixtures of oligoglycerol having average degrees of condensation of from 2 to 10 with saturated and/or unsaturated aliphatic carboxylic acids having 6 to 22 carbon atoms.

Finally, in accordance with group d), it is possible to ermploy alkyl and aryl phosphites, preferably those of the general formula

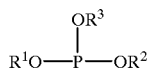

in which $R^1$, $R^2$ and $R^3$ independently of one another are an alkyl radical having 1 to 18 carbon atoms or a phenyl radical. Typical examples of group d) additives are tributyl phosphite, tripyhenyl phosphite, dimethyl phenyl phosphite and/or dimethyl stearyl phosphite. Diphenyl decyl phosphite is preferred.

The additives of group e) preferably comprise polymers of acrylic and methacrylic acid and their copolymers. The term copolymers has a dual meaning here: firstly, as pure copolymers of acrylic acid and methacrylic acid, and secondly as copolymers of (meth)acrylic acid with further addition-polymerizable monomers containing vinylic unsaturation. Examples of further addition-polymerizable monomers are unsaturated monomers containing sulfonic and phosphonic acid groups, unsaturated aliphatic carboxylic acids having 3 to 5 carbon atoms, amides of unsaturated aliphatic carboxylic acids having 3 to 5 carbon atoms, amino-containing unsaturated monomers and/or their salts, vinyl acetate, acrolein, vinyl chloride, acrylonitrile, vinylidenechloride, 1,3-butadiene, styrene, and alkylstyrenes having 1 to 4 carbon atoms in the alkyl radical. Examples of group e) additives are polyacrylic acids, polymethacrylic acid-below, acrylic acid and methacrylic acid and their derivatives are shortened for simplicity to (meth) acrylic acid and derivatives—and/or their salts, such as polysodium (meth)acrylate, copolymers of (meth)acrylic acid with maleic acid, maleic anhydride, styrenesulfonic acid, α-methylstyrene, 2-vinylpyridine, 1-vinylimidazole, dimethylaminopropyl(meth)acrylamide, 2-(meth)acrylamido-2-methylpropanesulfonic acid, (meth) acrylamide, N-hydroxydimethyl(meth)acrylamide and/or salts thereof. Among the polymeric additives, very particular preference is given to those having a predominantly anionic nature: that is, those in which the majority of acid groups are free or in the form of their salts. Particular preference is given to polymers of (meth)acrylic acid and to their copolymers with styrene, acrolein, alkylstyrene having 1 to 4 carbon atoms in the alkyl radical, styrenesulfonic acid, maleic acid and/or salts thereof, especially their sodium salts, and maleic anhydride. The polymeric additives of group e) judiciously possess a molecular weight of from 1000 to 10,000. The polymeric additives can be prepared by known techniques, such as bulk or solution polymerization (in this context cf. Ullmanns Encyclopädie der technischen Chemie, Vol. 19, 4th Edition, pages 2–11, 1980).

The additives of group g) are salts of fatty acids. Suitable fatty acids have already been listed in connection with group c) additives. Preference is given here to the alkali metal salts of the saturated fatty acids.

One or more additives from one or more of groups a) to g) can be employed to modify the katoites, the overall amount of additives being in the range from 0.1 to 10% by weight, based on katoite. In the case of combinations of the polymeric additives e) with further additives from groups a) to d) and f) and g) it is preferred to have the additives in amounts of from 50 to 90% by weight based on the overall amount of additives. Of the surface-modified katoites, particular preference is given to those modified with one or more additives from groups b), e) and g).

The katoites can be modified either in situ or subsequently.

In the case of subsequent modification, the katoites are intimately ground with organic or aqueous solutions of the additives, preferably with mills packed with grinding media and, in particular with a ball mill, and are subsequently dried conventionally. Where the additives are products which are low-melting or liquid at room temperature, it is of course unnecessary to use solutions of them. Otherwise, in the case of additives a) to g) it is most preferred to use clear aqueous solutions or solutions with polar organic solvents.

The term polar organic solvents embraces hydrocarbon compounds which are liquid at room temperature (from 15 to 25° C.) and carry at least one substituent which is more electronegative than carbon. These include chlorinated hydrocarbons, alcohols, ketones, esters, ethers and/or glycol ethers. Suitable polar organic solvents are methanol, ethanol, n-butanol, acetone, methyl ethyl ketone, methyl isobutyl ketone, cyclohexanol, isophorone, ethyl acetate, ethyl lactate, 2-methoxy ethyl acetate, tetrahydrofuran, ethyl glycol monomethyl ether and diethylene glycol monoethyl ether.

So that the surface of the katoites can be modified uniformly it is judicious, in the presence of additives of group e), for the latter to be soluble in polar organic solvents of the described type and/or water with pH values from 8 to 12. The term "soluble" in this context means that the polymeric additives e) are dissolved to the extent of at least 0.01% by weight, preferably 0.1% by weight, based on the solution, forming clear solutions in the polar organic solvents and in an aqueous solution with a pH of 10, established with alkali metal hydroxides at 20° C., and in particular are completely clear under the stated conditions.

Modification can also take place in situ; in other words, the additives, as such or in the form of their solutions, can be added directly to the calcium and aluminum hydroxide solutions from which the katoite is formed.

Finally, it is also possible to combine the two modes of modification, a route which is advisable for modification with two or more additives that show particular differences in their dissolution characteristics.

The compounds of the group mentioned under C) are elucidated as folllows:

Calcium Aluminum Hydroxo-hydrogen Phosphites

Compounds suitable for the stabilizer combinations of the invention and hailing from the group of basic calcium aluminum hydroxy hydrogen phosphites of the general formula

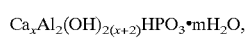

where x=2–8 and
m=0–12, or $$C_xAl_2(OH)_{2(x+3-y)}(HPO_3)_y \cdot mH_2O,$$

where
x=2–12, $$\frac{2x+5}{2} > y > 0 \text{ and}$$

m=0–12,
excluding y=1, if x=2–8,
can be prepared, for example, by means of a process in which mixtures of calcium hydroxide and/or calcium oxide, aluminum hydroxide and sodium hydroxide, or calcium hydroxide and/or calcium oxide and sodium aluminate, are reacted with phosphorous acid in aqueous medium in amounts appropriate for preparing the desired calcium aluminum hydroxy hydrogen phosphites and the reaction product is conventionally separated off and isolated. The product obtained directly from the above-described reaction can be separated from the aqueous reaction medium by known techniques, preferably by filtration. The reaction product separated off is worked up likewise in conventional manner—for example, by washing the filter cake with water and drying the washed residue at temperatures of for example 60–130° C., preferably at 90–120° C.

The reaction can be carried out using either finely divided active aluminum hydroxide in combination with sodium hydroxide, or a sodium aluminate. Calcium can be used in the form of finely divided calcium oxide or calcium hydroxide or mixtures thereof. The phosphorous acid can be employed in various concentrated form. The reaction temperatures are preferably between 50 and 100° C., more preferably between about 60 and 85° C. Catalysts or accelerators are not required but do no harm either. The water of crystallization in the compounds can be removed wholly or partially by heat treatment.

When used as stabilizers, the dried calcium aluminum hydroxy phosphites do not give off water at the customary processing temperatures for rigid PVC, for example, of 160–200° C., so that there is no disruptive formation of bubbles in the moldings.

To improve their dispersibility in halogen-containing thermoplastic resins, the compounds can be coated in a known manner with surface-active agent.

The compounds of the group specified under D) are elucidated as follows:
Aluminum Hydroxide Aluminum trihydroxide Al(OH)$_3$ has long been known to the skilled worker and occurs in crystalline form in nature as hydrargillite and—with AlO(OH), iron hydroxide, clay mineral or titanium dioxide impurities—as bauxite. The purification of amphoteric Al(OH)$_3$ is described inter alia in Lehrbuch der Anorganischen Chemie [Textbook of Inorganic Chemistry] (Holleman-Wiberg), Walter de Gruyter Verlag, 101st Edition, 1995, page 1077. Monoclinic γ-aluminum trihydroxide, γ-Al(OH)$_3$(hydrargillite, gibbsite) [also occurring naturally in mineral form (e.g., as scarbroite, nordstrandite or tucanite)] is obtained on slow settling from aluminate solutions at room temperature, while hexagonal α-aluminum trihydroxide α-Al(OH)$_3$ (bayerite) is obtained as a metastable modification on rapid precipitation. The latter is automatically but slowly transformed into the lower-energy form, hydrargillite. Precipitation from aluminum salt solutions with ammonia, for example, gives rise firstly to amorphous aluminum hydroxides of varying water content, which subsequently undergo slow conversion at room temperature via α-Al(OH)$_3$ into γ-Al(OH)$_{30}$. Crystalline Al(OH)$_3$ has a layer structure, in which each Al atom is surround octahedrally by six OH groups and each OH group belongs at the same time to two Al atoms. As a result, there are edge-joined Al(OH)$_6$ octahedra. The α-Al(OH)$_3$ structure can be described as follows: in a hexagonal close packing of OH$^-$ ions, every other layer is occupied 2/3 with Al$^{3+}$ ions. The γ-Al(OH)$_3$ structure is built up from corresponding layers of edge-linked Al(OH)$_6$ octahedra; the layers, however, are not superimposed on one another such that, as in α-Al(OH)$_3$, the OH groups of one layer lie in the hollows, but instead they lie over the OH groups of the next layer (between the layers, accordingly, α-Al(OH)$_3$ contains octahedral interstices and γ-Al(OH)$_3$ contains trigonal-prismatic interstices). For industrial preparation by the Bayer process and for the use of aluminum trihydroxide Al(OH)$_3$, see page 1078 in "Holleman-Wiberg".

Aluminum oxide hydroxide AlO(OH) occurs naturally in the form of diaspore [α-AlO(OH)], boehmite [γ-AlO(OH)] and—with Al(OH)$_3$, iron hydroxide, aluminosilicate, titanium dioxide and other impurities—in bauxite.

For the synthesis of aluminum oxide hydroxide AlO(OH) and the structure of α-AlO(OH) and γ-AlO(OH), see pages 1080 and 1081 of "Holleman-Wiberg". All of the aluminum hydroxides can also be employed in hydrated form.

The preparation of calcium aluminum hydroxo (hydrogen) carbonates is published in R. Fischer et al., Cement and Concrete Research (CCR), 12, 517 (1989); the synthesis of lithium layered lattice compounds is described, for example, in EP-A-0 761 756 and DE-A-4 425 275.
F) Lithium Layered Lattice Compounds Lithium aluminum layered lattice compounds have the general formula A $$Li_aM^{II}_{(b-2a)}Al_{(2+a)}OH_{(4+2b)}A^{n-}{}_{2/n} \cdot mH_2O$$

in which
M$^{II}$ is Mg, Ca or Zn and
A$^{n-}$ is a selected anion of valency n or a mixture of anions, and the indices lie in the range
0<a<(b−2)/2,
1<b<6 and
m=0 to 30
with the proviso that b−2a>2,
or have the general formula B $$[Al_2(Li_{(1-x)} \cdot M^{II}_x)(OH)_6]_n(A^{n-})_{1+x} \cdot mH_2O$$

in which
M$^{II}$, A, m and n are as defined above and
for x the condition 0.01≦x<1 is met.
These layered lattice compounds are prepared by reacting lithium hydroxide, lithium oxide and/or lithium compounds which can be converted to hydroxide, metal(II) hydroxides, metal(II) oxides and/or their compounds (compounds of the stated metals) than can be converted to hydroxides, and aluminum hydroxides and/or compounds thereof which can be converted to hydroxides, and also acids and/or their salts, and/or mixtures thereof, with one another in an aqueous medium at a pH of from 8 to 10 and at temperatures from 20 to 250° C. and separating off the solid reaction product obtained.

The reaction time is preferably from 0.5 to 40 hours, in particular from 3 to 15 hours.

The reaction product obtained directly from the reaction described above can be separated off from the aqueous reaction medium by known techniques, preferably by filtration. The isolated reaction product can be worked up likewise in a manner known per se by, for example, washing the filter cake with water and drying the washed residue at temperatures of, for example, from 60 to 150° C., preferably from 90 to 120° C.

For the reaction with aluminum it is possible to employ either finely divided, active metal(III) hydroxide in combination with sodium hydroxide or else an $NaAlO_2$. Lithium or one of the stated metal(II) compounds can be used in the form of finely divided lithium oxide or lithium hydroxide or mixtures thereof or of finely divided metal(II) oxide or metal(II) hydroxide or mixtures thereof, respectively. The corresponding acid anions can be employed in forms of different concentration, for example, directly as acid or else as salt.

The reaction temperatures lie preferably between about 20 and 250° C., more particularly between about 60 and 180° C. Catalysts or accelerators are not necessary. In the substances, the water of crystallization can be removed in whole or in part by heat treatment. When used as stabilizers, the dried layered lattice compounds do not give off water or gas at the common PVC processing temperatures of from 160 to 220° C., so that there is no disruptive bubble formation in the moldings. The anion $A^n$ in the above general formula can be sulfate, sulfite, sulfide, thiosulfate, peroxide, peroxosulfate, peroxodisulfate, hydrogen phosphate, hydrogen phosphite, carbonate, halide, nitrate, nitrite, hydrogen sulfate, hydrogen carbonate, hydrogen sulfite, hydrogen sulfide, dihydrogen phosphate, dihydrogen phosphite, monocarboxylate anions such as acetate and benzoate, amide, azide, hydroxide, hydroxylamine, hydroazide, acetylacetonate, phenolat, pseudohalide, halogenite, halogenate, perhalogenate, $I_3^-$, permanganate, dianions of dicarboxylic acids, such as phthalate, oxalate, maleate or fumarate, bisphenolate, phosphate, pyrophosphate, phosphite, pyrophosphite, trianions of tricarboxylic acids, such as citrate, trisphenolate and many more, as well as mixtures thereof. Among these anions, hydroxide, carbonate, phosphite and maleate are preferred.

To enhance the dispersibility of the substances in halogen-containing thermoplastic polymer compositions they can have been surface-treated with a higher fatty acid, such as stearic acid, an anionic surface-active agent, a silane coupler, a titanate coupler, or a glycerol fatty acid ester.

G) Titanium-containing Hydrotalcites

Titanium-containing hydrotalcites are described in WO 95/21127. Compounds of this kind, having the general formula $Al_aMg_bTi_c(OH)_d(CO_3)_e \cdot mH_2O$, in which a:b=1:1 to 1:10; $2 \leq b \leq 10$; $0 < c < 5$; $0 \leq m < 5$ and d and e are chosen so as to give a basic, charge-free molecule, can likewise be used.

The above-described calcium aluminum hydroxides, calcium aluminum hydroxo hydrogen phosphites, aluminum hydroxides, calcium aluminum hydroxo (hydrogen) carbonates, lithium layered lattice compounds and titanium-containing hydrotalacites can be present not only in crystalline form but also in partly crystalline form and/or amorphous form.

The compounds of type B to F can be employed in an amount of, for example, from 0.05 to 10 parts by weight, judiciously from 0.1 to 10 parts by weight and, in particular, from 0.5 to 10 parts by weight per 100 parts by weight of PVC.

Also in accordance with the invention is the blending of any desired combinations of A to F with polyols and disaccharide alcohols and/or perchlorate compounds and/or glycidyl compounds.

Polyols and Disaccharide Alcohols

Examples of suitable compounds of this type are pentaerythritol, dipentaerythritol, tripentaerythritol, trimethylolethane, bistrimethylolpropane, inositol (cyclitols), polyvinyl alcohol, bistrimethylolethane, trimethylolpropane, sorbitol (hexitols), maltitol, isomaltitol, cellobiitol, lactitol, lycasine, mannitol, lactose, leucrose, tris(hydroxyethyl) isocyanu rate, tris(hydroxypropyl) isocyanu rate, palatinitol, tetramethylolcyclohexanol, tetramethylolcyclopentanol, tetramethylol-cyclopyranol, xylitol, arabinitol (pentitols), tetritols, glycerol, diglycerol, polyglycerol, thiodiglycerol or 1-O-α-D-glycopyranosyl-D-mannitol dihydrate. Of these, preference is given to the disaccharide alcohols.

It is also possible to use polyol syrups, such as sorbitol, mannitol and maltitol syrup.

The polyols can be employed in an amount of, for example, from 0.01 to 20, judiciously from 0.1 to 20 and, in particular, from 0.1 to 10 parts by weight per 100 parts by weight of PVC.

Perchlorate Compounds

Examples are those of the formula $M(ClO_4)_n$, in which M is Li, Na, K, Mg, Ca, Sr, Ba, Zn, Al, La or Ce. Depending on the valency of M, the index n is 1, 2 or 3. The perchlorate salts can be present as solutions or can have been complexed with alcohols (polyols, cyclodextrins) or ether alcohols or ester alcohols. The ester alcohols also include the polyol partial esters. In the case of polyhydric alcohols or polyols, their dimers, trimers, oligomers and polymers are also suitable, such as di-, tri-, tetra- and polyglycols and also di-, tri- and tetrapentaerythitol or polyvinyl alcohol in various degrees of polymerization.

Other suitable solvents are phosphate esters and also cyclic and acyclic carbonates.

In this context, the perchlorate salts can be employed in various common forms of presentation; for example, as a salt or solution in water or an organic solvent as such, or adsorbed on a support material such as PVC, Ca silicate, zeolites or hydrotalcites, or bound by chemical reaction into a hydrotalcite or into another layered lattice compound. As polyol partial ethers, preference is given to glycerol monoether and glycerol monothioether.

Further embodiments are described in EP 0 394 547, EP 0 457 471 and WO 94/24200.

The perchlorates can be employed in an amount of, for example, from 0.001 to 5, judiciously from 0.01 to 3, and, with particular preference, from 0.01 to 2 parts by weight per 100 parts by weight of PVC.

Glycidyl Compounds

These contain the glycidyl group attached directly to carbon, oxygen, nitrogen or sulfur atoms, and in such compounds $R_1$ and $R_3$ are either both hydrogen and $R_2$ is hydrogen or methyl and n is 0 or $R_1$ and $R_3$ together are —$CH_2$—$CH_2$— or —$CH_2$—$CH_2$—$CH_2$— and in that case $R_2$ is hydrogen and n is 0 or 1.

I) Glycidyl esters and β-methylglycidyl esters obtainable by reacting a compound having at least one carboxyl group in the molecule and epichlorohydrin or glyceroldichlorohydrin or β-methylepichlorohydrin. The reaction takes place judiciously in the presence of bases.

As compounds having at least one carboxyl group in the molecule it is possible to use aliphatic carboxylic acids. Examples of these carboxylic acids are glutaric, adipic, pimelic, suberic, azelaic and sebacic acid or dimerized or trimerized linoleic acid, acrylic and methacrylic acid, caproic, caprylic, lauric, myristic, palmitic, stearic and pelargonic acid, and also the acids mentioned in connection with the organozinc compounds.

However, it is also possible to employ cycloaliphatic carboxylic acids, such as, for example, cyclohexanecarboxylic, tetrahydrophthalic, 4-methyltetrahydrophthalic, hexahydrophthalic or 4-methylhexahydrophthalic acid.

Aromatic carboxylic acids can also be used, examples being benzoic, phthalic, isophthalic, trimellitic and pyromellitic acid.

It is likewise possible to make use of carboxyl-terminated adducts of, for example, trimellitic acid with polyols, such as glycerol or 2,2-bis(4-hydroxy-cyclohexyl)propane.

Other epoxide compounds which can be used in the context of this invention are given in EP 0 506 617.

II) Glycidyl ethers or β-methylglycidyl ethers obtainable by reacting a compound having at least one free alcoholic hydroxyl group and/or phenolic hydroxyl group with an appropriately substituted epichlorohydrin under alkaline conditions or in the presence of an acidic catalyst with subsequent alkali treatment.

Ethers of this type are derived, for example, from acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol, and from monofunctional alcohols such as isooctanol, 2-ethylhexanol, isodecanol and also $C_7$–$C_9$-alkanol and $C_9$–$C_{11}$-alkanol mixtures.

They also derive, however, for example, from cycloaliphatic alcohols, such as 1,3- or 1,4-dihydroxycyclohexane, bis(4-hydroxycyclohexyl)methane, 2,2-bis-(4-hydroxycyclohexyl)propane or 1,1-bis(hydroxymethyl)cyclohex-3-ene, or they possess aromatic nuclei, such as N,N-bis(2-hydroxyethyl)aniline or p,p'-bis(2-hydroxyethylamino)diphenylmethane.

The epoxide compounds can also be derived from mononuclear phenols, such as from phenol, resorcinol or hydroquinone; or, they are based on polynuclear phenols, such as on bis(4-hydroxyphenyl)methane, 2,2-bis(4-hydroxyphenyl)propane, 2,2-bis(3,5-dibromo-4-hydroxyphenyl)propane, on 4,4'-dihydroxydiphenyl sulfone or on condensates of phenols with formaldehyde obtained under acidic conditions, such as phenol novolaks.

Examples of further possible terminal epoxides are: glycidyl-1-naphthyl ether, glycidyl-2-phenylphenyl ether, 2-biphenylyl glycidyl ether, N-(2,3-epoxypropyl)phthalimide and 2,3-epoxypropyl-4-methoxyphenyl ether.

III) N-Glycidyl compounds obtainable by dehydrochlorination of the reaction products of epichlorohydrin with amines containing at least one amino hydrogen atom. These amines are, for example, aniline, N-methylaniline, toluidine, n-butylamine, bis(4-aminophenyl)methane, m-xylylenediamine or bis(4-methylaminophenyl)methane, and also N,N,O-triglycidyl-m-aminophenol or N,N,O-triglycidyl-p-aminophenol.

The N-glycidyl compounds also include N,N'-di-, N,N', N"-tri- and N,N',N",N'''-tetraglycidyl derivatives of cycloalkyleneureas, such as ethyleneurea or 1,3-propyleneurea and N,N'-diglycidyl derivatives of hydantoins, such as of 5,5-dimethylhydantoin or glycoluril and triglycidyl isocyanurate.

IV) S-Glycidyl compounds such as di-S-glycidyl derivatives derived from dithiols, such as ethane-1,2-dithiol or bis(4-mercaptomethylphenyl) ether, for example.

V) Epoxide compounds having a radical of the formula I in which $R_1$ and $R_3$ together are —CH$_2$—CH$_2$— and n is 0 are bis(2,3-epoxycyclopentyl) ether, 2,3-epoxycyclopentylglycidyl ether or 1,2-bis(2,3-epoxycyclopentyloxy) ethane. An epoxy resin having a radical of the formula I in which $R_1$ and $R_3$ together are —CH$_2$–CH$_2$— and n is 1 is, for example, (3',4'-epoxy-6'-methylcyclohexyl)methyl 3,4-epoxy-6-methylcyclohexanecarboxylate.

Examples of suitable terminal epoxides are:
a) liquid bisphenol A diglycidyl ethers, such as Araldit®GY 240, Araldit®GY 250, Araldit®GY 260, Araldit®GY 266, Araldit®GY 2600, Araldit®MY 790;
b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610;
c) liquid bisphenol F diglycidyl ethers, such as Araldit®GY 281, Araldit®PY 302, Araldit®PY 306;
d) solid polyglycidyl ethers of tetraphenylethane, such as CG Epoxy Resin®0163;
e) solid and liquid polyglycidyl ethers of phenol-formaldehyde novolak, such as EPN 1138, EPN 1139, GY 1180, PY 307;
f) solid and liquid polyglycidyl ethers of o-cresol-formaldehyde novolak, such as ECN 1235, ECN 1273, ECN 1280, ECN 1299;
g) liquid glycidyl ethers of alcohols, such as Shell® Glycidyl ether 162, Araldit®DY 0390, Araldit®DY 0391;
h) liquid glycidyl ethers of carboxylic acids, such as Shell®Cardura E terephthalic acid ester, trimellitic acid ester, Araldit®PY 284;
i) solid heterocyclic epoxy resins (triglycidyl isocyanurate), such as Araldit®PT 810;
j) liquid cycloaliphatic epoxy resins such as Araldit®CY 179;
k) liquid N,N,O-triglycidyl ethers of p-aminophenol, such as Araldit®MY 0510;
l) tetraglycidyl-4,4'-methylenebenzamine or N,N,N',N'-tetraglycidyldiaminophenylmethane, such as Araldit®MY 720, Araldit®MY 721.

Preference is given to the use of epoxy compounds having two functional groups. In principle, however, it is also possible to employ epoxy compounds having one, three or more functional groups. Use is made predominantly of epoxy compounds, especially diglycidyl compounds, having aromatic groups.

If desired, it is also possible to employ a mixture of different epoxy compounds.

Particular preference is given as terminal epoxy compounds to diglycidyl ethers based on bisphenols, such as on 2,2-bis(4-hydroxyphenyl)propane (bisphenol A), bis(4-hydroxyphenyl)methane or mixtures of bis(ortholparahydroxyphenyl)methane (bisphenol F), for example.

The terminal epoxy compounds can be employed in an amount of preferably at least 0.1 part, for example from 0.1 to 50, judiciously from 1 to 30 and in particular, from 1 to 25 parts by weight, per 100 parts by weight of PVC.

Further customary additives can be added to the compositions of the invention, such as stabilizers, auxiliaries and processing aids, examples being alkali metal compounds and alkaline earth metal compounds, lubricants, plasticizers, pigments, fillers, phosphites, thiophosphites and thiophosphates, mercaptocarboxylic esters, epoxidized fatty acid esters, antioxidants, UV absorbers and light stabilizers, optical brighteners, impact modifiers and processing aids, gelling agents, antistats, biocides, metal passivators, flame inhibitors and blowing agents, antifog agents, compatibilizers and anti-plateout agents. (cf. "Handbook of PVC Formulating" by E. J. Wickson, John Wiley & Sons, New York 1993). Examples of such additives are as follows:

I. Fillers: Fillers (HANDBOOK OF PVC FORMULATING E. J. Wickson, John Wiley & Sons, Inc., 1993, pp. 393–449) and reinforcing agents (TASCHENBUCH der KUNSTOFFADDITIVE R. Gächter & H. Müller, Carl Hanser, 1990, pp. 549–615) are, for example, calcium carbonate, dolomite, wollastonite, magnesium oxide, magnesium hydroxide, silicates, china clay, talc, glass fibers, glass beads, wood flour, mica, metal oxides, or metal hydroxides, carbon black, graphite, rock flour, heavy spar, glass fibers, talc, kaolin and chalk. Chalk is preferred. The fillers can be employed in an amount of preferably at least 1 part, for example, from 5 to 200, judiciously from 10 to 150 and, in particular, from 15 to 100 parts by weight per 100 parts by weight of PVC.

II. Metal soaps: Metal soaps are primarily metal carboxylates of preferably relatively long-chain carboxylic acids. Familiar examples are stearates and laurates, and also oleates and salts of shorter-chain alkanecarboxylic acids. Alkylbenzoic acids are also said to be included under metal soaps. Metals which may be mentioned are Li, Na, K, Mg, Ca, Sr, Ba, Zn, Al, La, Ce and rare earth metals. Use is often made of what are known as synergistic mixtures, such as barium/zinc, magnesium/zinc, calcium/zinc or calcium/magnesium/zinc stabilizers. The metal soaps can be employed individually or in mixtures. A review of common metal soaps is given in Ullmann's Encyclopedia of Industrial Chemistry, $5^{th}$ Ed., Vol. A16 (1985), p. 361 ff.). It is judicious to use organic metal soaps from the series of the aliphatic saturated $C_2$–$C_{22}$ carboxylates, the aliphatic unsaturated $C_3$–$C_{22}$ carboxylates, the aliphatic $C_2$–$C_{22}$ carboxylates substituted by at least one OH group, the cyclic and bicyclic carboxylates having 5–22 carbon atoms, the unsubstituted benzenecarboxylates substituted by at least one OH group and/or by $C_1$–$C_{16}$-alkyl, the unsubstituted naphthalenecarboxylates substituted by at least one OH group and/or by $C_1$–$C_{16}$-alkyl, the phenyl $C_1$–$C_{16}$-alkylcarboxylates, the naphthyl $C_1$–$C_{16}$-alkylcarboxylates or the unsubstituted or $C_1$–$C_{12}$-alkyl-substituted phenolates, tallates and resinates.

Named examples which may be mentioned are the zinc, calcium, magnesium or barium salts of monovalent carboxylic acids such as acetic, propionic, butyric, valeric, hexanoic, oenanthic, octanoic, neodecanoic, 2-ethylhexanoic, pelargonic, decanoic, undecanoic, dodecanoic, tridecanoic, myristic, palmitic, isostearic, stearic, 12-hydroxystearic, behenic, benzoic, p-tert-butylbenzoic, N,N-dimethylhydroxybenzoic, 3,5-di-tert-butyl-4-hydroxybenzoic, toluic, dimethylbenzoic, ethylbenzoic, n-propylbenzoic, salicylic, p-tert-octylsalicylic and sorbic acid; calcium, magnesium and zinc salts of the monoesters of divalent carboxylic acids such as oxalic, malonic, succinic, glutaric, adipic, fumaric, pentane-1,5-dicarboxylic, hexane-1,6-dicarboxylic, heptane-1,7-dicarboxylic, octane-1,8-dicarboxylic, phthalic, isophthalic, terephthalic and hydroxyphthalic acid; and of the di- or triesters of tri- or tetravalent carboxylic acids such as hemimellitic, trimellitic, pyromellitic and citric acid.

Preference is given to calcium, magnesium and zinc carboxylates of carboxylic acids having 7 to 18 carbon atoms (metal soaps in the narrow sense), such as, for example, benzoates or alkanoates, preferably stearate, oleate, laurate, palmitate, behenate, hydroxystearates, dihydroxystearates or 2-ethylhexanoate. Particular preference is given to stearate, oleate and p-tert-butylbenzoate. Overbased carboxylates, such as overbased zinc octoate, are also preferred. Preference is likewise given to overbased calcium soaps.

If desired, it is also possible to employ a mixture of carboxylates of different structures.

Preference is given to compositions, as described, comprising an organozinc and/or organocalcium compound.

In addition to the compounds mentioned, organoaluminum compounds are also suitable, as are compounds analogous to those mentioned above, especially aluminum tristearate, aluminum distearate and aluminum monostearate, and also aluminum acetate and basic derivatives derived therefrom.

Further information on the aluminum compounds which can be used and are preferred is given in U.S. Pat. No. 4,060,512 and U.S. Pat. No. 3,243,394.

Also suitable in addition to the compounds already mentioned are organic rare earth compounds, especially compounds analogous to those mentioned above. The term rare earth compound means especially compounds of the elements cerium, praseodymium, neodymium, samarium, europium, gadolinium, terbium, dysprosium, holmium, erbium, thulium, ytterbium, lutetium, lanthanum and yttrium, mixtures—especially with cerium—being preferred. Further preferred rare earth compounds can be found in EP-A-0 108 023.

It is possible if desired to employ a mixture of zinc, alkali metal, alkaline earth metal, aluminum, cerium, lanthanum or lanthanoid compounds of different structure. It is also possible for organozinc, organoaluminum, organocerium, organo-alkali metal, organo-alkaline earth metal, organolanthanum or organolanthanoid compounds to be coated on an alumo salt compound; in this regard see also DE-A-4 031 818.

The metal soaps and/or mixtures thereof can be employed in an amount of, for example, from 0.001 to 10 parts by weight, judiciously from 0.01 to 8 parts and, with particular preference, from 0.05 to 5 parts by weight per 100 parts by weight of PVC. The same applies to the further metal stabilizers:

III. Further metal stabilizers: Here, mention may be made in particular of the organotin stabilizers. These can be the carboxylates, mercaptides and sulfides, in particular. Examples of suitable compounds are described in U.S. Pat. No. 4,743,640.

IV. Alkali metal and alkaline earth metal compounds: By these are meant principally the carboxylates of the above-described acids, but also corresponding oxides and/or hydroxides or carbonates. Also suitable are mixtures thereof with organic acids. Examples are LiOH, NaOH, KOH, CaO, $Ca(OH)_2$, MgO, $Mg(OH)_2$, $Sr(OH)_2$, $Al(OH)_3$, $CaCO_3$ and $MgCO_3$ (also basic carbonates, such as magnesia alba and huntite), and also Na and K salts of fatty acids. In the case of alkaline earth metal and Zn carboxylates it is also possible to employ their adducts with MO or $M(OH)_2$ (M=Ca, Mg, Sr or Zn), known as "overbased" compounds. In addition to the stabilizer combination of the invention it is preferred to employ alkali metal carboxylates, alkaline earth metal carboxylates and/or aluminum carboxylates.

V. Lubricants: Examples of suitable lubricants are montan wax, fatty acid esters, PE waxes, amide waxes, chlorinated paraffins, glycerol esters or alkaline earth metal soaps.

Lubricants which can be used are also described in "Kunststoffadditive", R. Gächter/H. Müller, Carl Hanser Verlag, 3rd Ed., 1989, pages 478–488. Mention may also be made of fatty ketones (as described in DE 4 204 887) and of silicone-based lubricants (as described in EP 0 225 261) or combinations thereof, as set out in EP 0 259 783. Calcium stearate is preferred. The lubricants can also be applied to an alumo salt compound; in this regard see also DE-A-4 031 818.

VI. Plasticizers Examples of suitable organic plasticizers are those from the following groups:

A) Phthalates: Examples of such plasticizers are dimethyl, diethyl, dibutyl, dihexyl, di-2-ethylhexyl, di-n-octyl, diisooctyl, diisononyl, diisodecyl, diisotridecyl, dicyclohexyl, dimethylcyclohexyl, dimethylglycol, dibutylglycol, benzyl butyl and diphenyl phthalate, and also mixtures of phthalates, such as $C_7$–$C_9$- and $C_9$–$C_{11}$-alkyl phthalates obtained from predominantly linear alcohols, $C_6$–$C_{10}$-n-alkyl phthalates and $C_8$–$C_{10}$-n-alkyl phthalates. Of these preference is given to dibutyl, dihexyl, di-2-ethylhexyl, di-n-octyl, diisooctyl, diisononyl, diisodecyl, diisotridecyl and benzyl butyl phthalate, and the stated mixtures of alkyl phthalates. Particular preference is given to di-2-ethylhexyl, diisononyl and diisodecyl phthalate, which are also known by the common abbreviations DOP (dioctyl phthalate, di-2-ethylhexyl phthalate), DINP (diisononyl phthalate) and DIDP (diisodecyl phthalate).

B) Esters of aliphatic dicarboxylic acids, especially esters of adipic, azelaic and sebacic acid: examples of such plasticizers are di-2-ethylhexyl adipate, diisooctyl adipate (mixture), diisononyl adipate (mixture), diisodecyl adipate (mixture), benzyl butyl adipate, benzyl octyl adipate, di-2-ethylhexyl azelate, di-2-ethylhexyl sebacate and diisodecyl sebacate (mixture). Di-2-ethylhexyl adipate and diisooctyl adipate are preferred.

C) Trimellitates, examples being tri-2-ethylhexyl trimellitate, triisodecyl trimellitate (mixture), triisotridecyl trimellitate, triisooctyl trimellitate (mixture) and also tri-$C_6$–$C_8$-alkyl, tri-$C_6$–$C_{10}$-alkyl, tri-$C_7$–$C_9$-alkyl- and tri-$C_9$–$C_{11}$-alkyl trimellitates. The latter trimellitates are formed by esterification of trimellitic acid with the corresponding alkanol mixtures. Preferred trimellitates are tri-2-ethylhexyl trimellitate and the abovementioned trimellitates from alkanol mixtures. Customary abbreviations are TOTM (trioctyl trimellitate, tri-2-ethylhexyl trimellitate), TIDTM (triisodecyl trimellitate) and TITDTM (triisotridecyl trimellitate).

D) Epoxy plasticizers: These are primarily epoxidized unsaturated fatty acids, such as epoxidized soybean oil.

E) Polymer plasticizers: A definition of these plasticizers and examples of them are given in "Kunststoffadditive", R. Gächter/H. Müller, Carl Hanser Verlag, 3rd Ed., 1989, section 5.9.6, pages 412–415, and also in "PVC Technology", W. V. Titow, 4$^{th}$. Ed., Elsevier Publ., 1984, pages 165–170. The most common starting materials for preparing the polyester plasticizers are: dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol.

F) Phosphoric esters: A definition of these esters is given in the bovementioned "Taschenbuch der Kunststoffadditive" section 5.9.5, pp. 408–412. Examples of such phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and to ®Reofos 50 and 95 (Ciba Spezialitätenchemie).

G) Chlorinated hydrocarbons (paraffins)

H) Hydrocarbons

I) Monoesters, e.g., butyl oleate, phenoxyethyl oleate, tetrahydrofurfuryl oleate and alkylsulfonic esters.

J) Glycol esters, e.g., diglycol benzoates.

Definitions and examples of plasticizers of groups G) to J) are given in the following handbooks:

"Kunststoffadditive", R. Gächter/H. Müller, Carl Hanser Verlag, 3rd Ed., 1989, section 5.9.14.2, pp.422–425, (group G), and section 5.9.14.1, p. 422, (group H).

"PVC Technology", W. V. Titow, 4th Ed., Elsevier Publishers, 1984, section 6.10.2, pages 171–173, (group G), section 6.10.5 page 174, (group H), section 6.10.3, page 173, (group I) and section 6.10.4, pages 173–174(group J).

It is also possible to use mixtures of different plasticizers. The plasticizers can be employed in an amount of, for example, from 5 to 20 parts by weight, judiciously from 10 to 20 parts by weight, per 100 parts by weight of PVC. Rigid or semirigid PVC contains preferably up to 10%, with particular preference up to 5%, or no plasticizer.

VII. Pigments: Suitable substances are known to the person skilled in the art. Examples of inorganic pigments are $TiO_2$, zirconium oxide-based pigments, $BaSO_4$, zinc oxide (zinc white) and lithopones (zinc sulfide/barium sulfate), carbon black, carbon black/titanium dioxide mixtures, iron oxide pigments, $Sb_2O_3$, $(Ti,Ba,Sb)O_2$, $Cr_2O_3$, spinels, such as cobalt blue and cobalt green, $Cd(S,Se)$, ultramarine blue. Organic pigments are, for example, azo pigments, phthalocyanine pigments, quinacridone pigments, perylene pigments, diketopyrrolopyrrole pigments and anthraquinone pigments. Preference is also given to $TiO_2$ in micronized form. A definition and further descriptions are given in "Handbook of PVC Formulating", E. J. Wickson, John Wiley & Sons, New York, 1993.

VIII. Phosphites (phosphorous triesters): Examples are triphenyl phosphite, diphenyl alkyl phosphites, phenyl dialkyl phosphites, tris(nonyl-phenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis-(2,6-di-tert-butyl-4-methylphenyl) pentaerythritol diphosphite, bisisodecyloxypentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, bis(2,4-di-tert-butyl-6-methylphenyl) methyl phosphite, bis(2,4-di-tert-butyl-6-methylphenyl) ethyl phosphite. Particularly suitable are trioctyl, tridecyl, tridodecyl, tritetradecyl, tristearyl, trioleyl, triphenyl, tricresyl, tris-p-nonylphenyl or tricyclohexyl phosphite and, with particular preference, the aryl dialkyl and alkyl diaryl phosphites, examples being phenyl didecyl, 2,4-di-tert-butylphenyl didodecyl phosphite, 2,6-di-tert-butylphenyl didodecyl phosphite and the dialkyl and diaryl pentaerythritol diphosphites, such as distearyl pentaerythritol diphosphite, and also nonstoichiometric triaryl phosphites whose composition is, for example, $(H_{19}C_9-C_6H_4)O_{1.5}P(OC_{12.13}H_{25.27})_{1.5}$ or $(H_8C_{17}-C_6H_4)O_2P(i-C_8H_{17}O)$ oder $(H_{19}C_9-C_6H_4)O_{1.5}P(OC_{9.11}H_{19.23})_{1.5}$ or

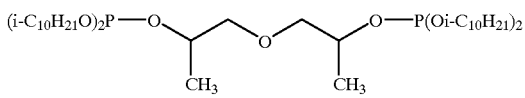

Preferred organic phosphites are distearyl pentaerythritol diphosphite, trisnonylphenyl phosphite and phenyl didecyl phosphite. Other suitable phosphites are phosphorous diesters (with abovementioned radicals) and phosphorous monoesters (with abovementioned radicals), possibly in the form of their alkali metal, alkaline earth metal, zinc or aluminum salts. It is also possible for these phosphorous esters to have been applied to an alumo salt compound; in this regard see also DE-A-4 031 818.

The organic phosphites can be employed in an amount of, for example, from 0.01 to 10, judiciously from 0.05 to 5 and, in particular, from 0.1 to 3 parts by weight per 100 parts by weight of PVC.

IX. Thiophosphites and thiophosphates: By thiophosphites and thiophosphates are meant compounds of the general type $(RS)_3P$, $(RS)_3P{=}O$ and $(RS)_3P{=}S$, respectively, as are described, for instance, in the patents DE 2 809 492, EP 0 090 770 and EP 0 573 394. Examples of these compounds are: trithiohexyl phosphite, trithiooctyl phosphite, trithiolauryl phosphite, trithiobenzyl phosphite, trithiophosphorous acid tris(carbo-i-octyloxy)methyl ester, tritliiophosphorous acid tris(carbotrimethylcyclohexyloxy)methyl ester, trithiophosphoric acid S,S,S-tris(carbo-i-octyloxy)methyl ester, trithiophosphoric acid S,S,S-tris(carbo-2-ethylhexyloxy) methyl ester, trithiophosphoric acid S,S,S-tris-1-(carbohexyloxy)ethyl ester, trithiophosphoric acid S,S,S-tris-1-(carbo-2-ethylhexyloxy)ethyl ester and trithiophosphoric acid S,S,S-tris-2-(carbo-2-ethylhexyloxy) ethyl ester.

X. Mercaptocarboxylic esters: Examples of these compounds are: esters of thioglycolic acid, thiomalic acid, mercaptopropionic acid, the mercaptobenzoic acids and thiolactic acid, mercaptoethyl stearate and mercaptoethyl oleate, as are described in patents FR 2 459 816, EP 0 090 748, FR 2 552 440 and EP 0 365 483. The generic mercaptocarboxylic esters also embrace polyol esters and partial esters thereof, and also thioethers derived from them.

XI. Epoxidized fatty acid esters and other epoxy compounds: The stabilizer combination of the invention may additionally comprise preferably at least one epoxidized fatty acid ester. Particularly suitable such esters are those of fatty acids from natural sources (fatty acid glycerides), such as 20soybean oil or rapeseed oil. It is, however, also possible to employ synthetic products such as epoxidized butyl oleate. Epoxidized polybutadiene and polyisoprene can also be used, as they are or in partially hydroxylated form, or else homo- or copolymeric glycidyl acrylate and glycidyl methacrylate can be used. These epoxy compounds can also have been applied to an alumo salt compound; in this regard see also DE-A-4 031 818.

XII. Antioxidants Examples of suitable such compounds are:

1) Alkylated monophenols, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-iso-butylphenol, 2,6-di-cyclopentyl-4-methylphenol, 2-(alpha-methylcyclohexyl)-4,6-dimethylphenol, 2,6-di-octadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)-phenol, 2,4-dimethyl-6-(1'-methyltridec-1'-yl)phenol, octylphenol, nonyl-phenol, dodecylphenol and mixtures thereof.

2) Alkylthiomethylphenols, for example, 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

3) Alkylated hydroquinones, for example, 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

4) Hydroxylated thiodiphenyl ethers, for example, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

5) Alkylidenebisphenols, for example, 2,2'-methylenebis (6-tert-butyl-4-methylphenol), 2,2'-methylenebis(6-tert-butyl-4-ethylphenol), 2,2'-methylenebis[4-methyl-6-(alpha-methylcyclohexyl)phenol], 2,2'-methylenebis (4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha,alpha-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis (3-tert-butyl-5-methyl-2-hydroxybenzyl)-4-methylphenol, 1,1,3-tris(5-tert-butyl-4-hydroxy-2-methylphenyl)butane, 1,1-bis-(5-tert-butyl-4-hydroxy-2-methylphenyl)-3-n-dode-cylmercaptobutane, ethyleneglycol-bis-[3,3-bis-(3'-tert-butyl-4'-hydroxyphenyl)butyrat], bis-(3-tert-butyl-4-hydroxy-5-methyl-phenyl)dicyclopenta-diene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl) propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

6) Benzyl compounds, for example, 3,5,3',5'-tetra-tert-butyl-4,4'-dihydroxydibenzyl ether, octadecyl 4-hydroxy-3,5-dimethylbenzyl-mercaptoacetate, tris(3, 5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide. isooctyl 3,5-di-tert-butyl-4-hydroxybenzyl-mercaptoacetate.

7) Hydroxybenzylated malonates, for example, dioctadecyl 2,2-bis(3,5-di-tert-butyl-2-hydroxybenzyl) malonate, dioctadecyl 2-(3-tert-butyl-4-hydroxy-5-methylbenzyl)malonate, didodecyl mercaptoethyl-2,2-bis(3,5-di-tert-butyl-4-hydroxybenzyl)malonate, di[4-(1,1,3,3-tetramethylbutyl)-phenyl]2,2-bis(3,5-di-tert-butyl-4-hydroxybenzyl)malonate.

8) Aromatic hydroxybenzyl compounds, for example, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene, 2,4,6-tris (3,5-di-tert-butyl-4-hydroxybenzyl)phenol.

9) Triazine compounds, for example, 2,4-bisoctylmercapto-6-(3,5-di-tert-butyl-4-hydroxyanilino)-1,3,5-triazine, 2-octylmercapto-4,6-bis-(3,5-di-tert-butyl-4-hydroxyanilino)-1,3,5-triazine, 2-octylmercapto-4,6-bis-(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris (4-tert-butyl-3-hydroxy-2,6-dimethylbenzyl)-isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris-(3,5-dicyclohexyl-4-hydroxybenzyl) isocyanurate.

10) Phosphonates and phosphonites, for example, dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, Ca salt of monoethyl 3,5-di-tert-butyl-4-hydroxybenzylphosphonate, tetrakis(2,4-di-tert-butylphenyl)-4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine.

11) Acylaminophenols, for example, 4-hydroxylauranilide, 4-hydroxystearanilide, octyl N-(3,5-di-tert-butyl-4-hydroxyphenyl)carbamate.

12) Esters of beta-(3,5-di-tert-butyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propane diol, neopentyl glycol, thiodiethylene glycol, diethylene glycol, triethylene glycol, pentaerythritol, dipentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, ditrimethylolpropane, 4-hydroxymethyl-1-phospha-2,6,7-trioxabicyclo [2.2.2]octane.

13) Esters of beta(5-tert-butyl-4-hydroxy-3-methylphenyl)propionic acid with mono- or polyhydric alcohols, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

14) Esters of beta(3,5-dicyclohexyl-4-hydroxyphenyl) propionic acid with mono- or polyhydric alcohols, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis (hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane .

15) Esters of 3,5-di-tert-butyl-4-hydroxyphenylacetic acid with mono- or polyhydric alcohols, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis (hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

16) Amides of beta(3,5-di-tert-butyl-4-hydroxyphenyl)-propionic acid, for example, N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

17) Vitamin E (tocopherol) and derivatives.

Preference is given to antioxidants of groups 1–5, 10 and 12, especially 2,2-bis(4-hydroxyphenyl)propane, esters of 3,5-di-tert-butyl-4-hydroxyphenylpropionic acid with octanol, octadecanol or pentaerythritol or tris(2,4-di-tert-butylphenyl) phosphite.

It is also possible, if desired, to employ a mixture of antioxidants of different structure.

The antioxidants can be employed in an amount of, for example, from 0.01 to 10 parts by weight, judiciously from 0.1 to 10 parts by weight and in particular, from 0.1 to 5 parts by weight per 100 parts by weight of PVC.

XIII. UV absorbers and light stabilizers: Examples of these are:

1) 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl) benzotriazole, 2-(3',5'-di-tert-butyl-2'-hydroxyphenyl)-5-chlorobenzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)-benzotriazole, 2-(2'-hydroxy-4'-octoxyphenyl)benzotriazole, 2-(3',5'-di-tert-amyl-2'-hydroxyphenyl)benzotriazole, 2-(3',5'-bis (alpha,alpha-dimethylbenzyl)-2'-hydroxyphenyl) benzotriazole, mixtures of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy) carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl)benzotriazole and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxy-phenyl] benzotriazole with polyethylene glycol 300;

[RCH$_2$CH$_2$COO(CH$_2$)$_2$—]$_2$— where R=3'-tert-butyl-4'-hydroxy-5'-2H-benzotriazol-2-yl-phenyl.

2) 2-Hydroxybenzophenones, for example the 4-hydroxy, 4-methoxy, 4-octoxy, 4-decyloxy, 4-dodecyloxy, 4-benzyloxy, 4,2',4'-trihydroxy, 2'-hydroxy-4,4'-dimethoxy derivative.

3) Esters of substituted or unsubstituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl3,5-di-tert-butyl-4-hydroxybenzoate, hexadecyl3,5-di-tert-butyl-4-hydroxybenzoate, octadecyl 3,5-di-tert-butyl-4-hydroxybenzoate, 2-methyl-4,6-di-tert-butylphenyl3,5-di-tert-butyl-4-hydroxybenzoate.

4) Acrylates, for example ethyl alpha-cyano-beta,beta-diphenylacrylate or isooctyl-ethyl alpha-cyano-beta, beta-diphenylacrylate, methyl alpha-carbomethoxycinnamate, methyl alpha-cyano-beta-methyl-p-methoxycinnamate or butyl alpha-cyano-beta-methyl-p-methoxycinnamate, methyl alpha-carbomethoxy-p-methoxy-cinnamate, N-(beta-carbomethoxy-b-cyanovinyl)-2-methyl-indoline.

5) Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters such as the methyl or ethyl ester, of 4-hydroxy-3,5-di-tert-butylbenzylphosphonic acid, nickel complexes of ketoximes, such as of 2-hydroxy-4-methylphenyl undecyl ketoxime, nickel complexes of 1-phenyl-4-lauroyl-5-hydroxypyrazole, with or without additional ligands.

6) Oxalamides, for example 4,4'-dioctyloxyoxanilide, 2,2'-dioctyloxy-5,5'-di-tert-butyl-oxanilide, 2,2'-didodecyloxy-5,5'di-tert-butyloxanilide, 2-ethoxy-2'-ethyl-oxanilide, N,N'-bis(3-dimethylaminopropyl) oxalamide, 2-ethoxy-5-tert-butyl-2'-ethyloxanilide and its mixture with 2-ethoxy-2'-ethyl-5,4'-di-tert-butyl-oxanilide, mixtures of o- and p-methoxy and of o- and p-ethoxy-di-substituted oxanilides.

7) 2-(2-Hydroxyphenyl)-1,3,5-triazines, for example 2,4, 6-tris(2-hydroxy-4-octyloxyphenyl)-1,3,5-triazine, 2-(2-hydroxy-4-octyloxyphenyl)-4,6-bis(2,4-d imethyl phenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-d imethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyl-oxypropyloxy)phenyl]-4,6-bis(2,4-dimethylphenyl)-1, 3,5-triazine, 2-[2-hydroxy-4-(2-hydroxy-3-octyloxypropyloxy)phenyl]-4,6-bis(2,4-dimethyl-phenyl)-1 ,3,5-triazine.

XIV. Blowing agents: Examples of blowing agents are organic azo and hydrazo compounds, tetrazoles, oxazines, isatoic anhydride, and also sodium carbonate and sodium bicarbonate. Preference is given to azodicarboxamide and sodium bicarbonate and mixtures thereof.

Definitions and examples of impact modifiers and processing aids, gelling agents, antistats, biocides, metal passivators, optical brighteners, flame retardants, antifogging agents and compatibilizers are described in "Kunststoffadditive", R. Gächter/H. Müller, Carl Hanser Verlag, 3rd Ed., 1989, and in the "Handbook of Polyvinyl Chloride Formulating" E. J. Wickson, J. Wiley & Sons, 1993, and in "Plastics Additives" G. Pritchard, Chapman & Hall, London, 1st Ed., 1998.

Impact modifiers are also described in detail in "Impact Modifiers for PVC", J. T. Lutz/D. L. Dunkelberger, John Wiley & Sons, 1992.

Examples of the PVC materials to be stabilized are: polymers of vinyl chloride and of vinylidene chloride, vinyl resins comprising vinyl chloride units in their structure, such as copolymers of vinyl chloride, and vinyl esters of aliphatic acids, especially vinyl acetate, copolymers of vinyl chloride with esters of acrylic and methacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and its copolymers with vinyl chloride and other polymerizable compounds; polymers of vinyl chloroacetate and dichlorodivinyl ether; chlorinated polymers of vinyl acetate, chlorinated polymeric esters of acrylic acid and of alpha-substituted acrylic acid; polymers of chlorinated styrenes, for example dichlorostyrene; chlorinated rubbers; chlorinated polymers of ethylene; polymers and post-chlorinated polymers of chlorobutadiene and copolymers thereof with vinyl chloride, chlorinated natural and synthetic rubbers, and also mixtures of these polymers with one another or with other polymerizable compounds. In the context of this invention, PVC also embraces copolymers with polymerizable compounds such as acrylonitrile, vinyl acetate or ABS, which can be suspension, bulk or emulsion polymers. Preference is given to a PVC homopolymer, alone or in combination with polyacrylates.

Also included are the graft polymers of PVC with EVA, ABS and MBS. Preferred substrates are also mixtures of the abovementioned homo- and copolymers, especially vinyl chloride homopolymers, with other thermoplastic and/or elastomeric polymers, especially blends with ABS, MBS, NBR, SAN, EVA, CPE, MBAS, PMA, PMMA, EPDM and polylactones.

Examples of such components are compositions of (i) 20–80 parts by weight of a vinyl chloride homopolymer (PVC) and (ii) 80–20 parts by weight of at least one thermoplastic copolymer based on styrene and acrylonitrile, in particular from the group ABS, NBR, NAR, SAN and EVA. The abbreviations used for the copolymers are familiar to the person skilled in the art and have the following meanings: ABS: acrylonitrile-butadiene-styrene; SAN: styrene-acrylonitrile; NBR: acrylonitrile-butadiene; NAR: acrylonitrile-acrylate; EVA: ethylene-vinyl acetate. Also suitable in particular are acrylate-based styrene-acrylonitrile copolymers (ASA). Preferred components in this context are polymer compositions comprising as components (i) and (ii) a mixture of 25–75% by weight PVC and 75–25% by weight of the abovementioned copolymers. Examples of such compositions are: 25–50% by weight PVC and 75–50% by weight copolymers or 40–75% by weight PVC and 60–25% by weight copolymers. Preferred copolymers are ABS, SAN and modified EVA, especially ABS. NBR, NAR and EVA are also particularly suitable. In the composition of the invention it is possible for one or more of the abovementioned copolymers to be present. Particularly important components are compositions comprising (i) 100 parts by weight of PVC and (ii) 0–300 parts by weight of ABS and/or SAN-modified ABS and 0–80 parts by weight of the copolymers NBR, NAR and/or EVA, but especially EVA.

For stabilization in the context of this invention, further suitable polymers are, in particular, recyclates of chlorine-containing polymers, these polymers being the polymers described in more detail above that have also undergone damage through processing, use or storage. PVC recyclate is particularly preferred. The recyclates may also include small amounts of extraneous substances, such as paper, pigments, adhesives, which are often difficult to remove. These extraneous substances may also arise from contact with various materials in the course of use or reprocessing, examples being residues of fuel, fractions of coating material, traces of metal and residues of initiator.

Stabilization in accordance with the invention is of particular advantage in the context of PVC formulations as are customary for pipes and profiles. Stabilization can be effected without heavy metal compounds (Sn, Pb, Cd, Zn-stabilizers). This characteristic offers advantages in certain fields, since heavy metals—with the exception of zinc at best—are often unwanted both during the production and during the use of certain PVC articles, on ecological grounds. The production of heavy metal stabilizers also often causes problems from an industrial hygiene standpoint. Similarly, the processing of ores containing heavy metals is frequently associated with serious effects on the environment, the environment here including the biosystem of humankind, animals (fish), plants, the air and soil. For these reasons, the incineration and landfilling of plastics containing heavy metals is also disputed.

The invention also relates to a method of stabilizing PVC, which comprises adding thereto at least one of the abovementioned stabilizer combinations.

The stabilizers can judiciously be incorporated by the following methods: as an emulsion or dispersion (one possibility, for example, is the form of a pastelike mixture. An advantage of the combination of the invention in the case of this form is the stability of the paste.); as a dry mix in the course of the mixing of additional components or polymer mixtures; by direct addition to the processing apparatus (e.g. calenders, mixers, compounders, extruders and the like), or as a solution or melt.

The PVC stabilized in accordance with the invention, to which the invention likewise relates, can be prepared in a manner known per se using devices known per se such as the abovementioned processing apparatus to mix the stabilizer combination of the invention and any further additives with the PVC. In this case, the stabilizers can be added individually or as a mixture or else in the form of so-called masterbatches.

The PVC stabilized in accordance with the present invention can be brought into the desired form by known methods. Examples of such methods are milling, calendering, extruding, injection molding or spinning, and also extrusion blow molding. The stabilized PVC can also be processed to foam materials.

A rigid PVC stabilized in accordance with the invention is suitable, for example, for hollow articles (bottles), packaging films (thermoform sheets), blown films, pipes, foam materials, heavy profiles (window frames), transparent-wall profiles, construction profiles, sidings, fittings, office films and apparatus enclosures (computers, domestic appliances).

Preference is given to PVC rigid foam articles and PVC pipes for drinking water or waste water, pressure pipes, gas pipes, cable-duct pipes and cable protection pipes, pipes for industrial pipelines, seepage pipes, flowoff pipes, guttering pipes and draining pipes. For further details on this subject see "Kunststoffhandbuch PVC", Vol. 2/2, W. Becker/H. Braun, 2nd Ed., 1985, Carl Hanser Verlag, pages 1236–1277.

The compounds of the formula I are prepared by known methods, as set out in more detail in the example which follows. In that example, as in the remainder of the text, parts and percentages are by weight unless stated otherwise.

EXAMPLE 1

Preparation of 6-amino-1,3-dimethyluracil

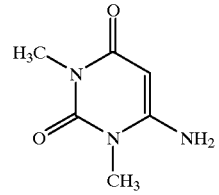

(Ia)

224.8 g of N,N'-dimethylurea,
238.7 g of cyanoacetic acid and
310.9 g of acetic anhydride
are heated to 80° C. under nitrogen and with stirring. Stirring is continued at 80° C. for 2 hours and the reaction vessel is evacuated to 50 mbar so that the acetic acid is distilled off. After cooling, 250 g of ice-water are added at 35° C. 10 minutes of stirring are followed by the dropwise addition, with ice cooling, of 567 g of 15% strength sodium hydroxide solution, in the course of which the pH, up to 475 ml, does not rise above 7. After a pH of 7 is exceeded, a change in the precipitate is observed, and the mixture warms up from 23 to about 50° C. The pH is now 10.2. Following the addition of 200 g of water, stirring is continued for 10 minutes and the mixture is heated at reflux. After one hour at reflux, it is cooled to 20° C. and filtered with suction. The filter cake is washed twice with 100 g of cold water each time and then dried at 90° C. in a vacuum drying cabinet.

Yield: 334 g (86.1% of theory), melting point: 282° C.

EXAMPLE I

Static heat test

A dry mix consisting of the components indicated in the following formulations (cf. Table 1) is rolled on a mixing roller bed at 200° C. for 5 minutes. Test film sections 0.3 mm thick are taken from the resulting rolled sheet. The film samples undergo thermal loading at 190° C. in an oven. At intervals of 3 minutes, the Yellowness Index (YI) is determined in accordance with ASTM D-1925-70. The results are given in Table 2 below. Low YI values denote good stabilization.

| Formulation: | | |
|---|---|---|
| | Norvinyl S 6775 | 100.0 parts |
| | Omyalite 95 T | 2.0 parts |
| | 1,3-Dimethyl-6-aminouracil | 0.2 parts |
| | Irgawax 367 | 0.7 parts. |
| | Wax PE 520 | 0.6 parts |

-continued

| | | |
|---|---|---|
| | Wax AC 629 A | 0.2 parts |
| | Ca stearate | 0.8 parts |
| | Costab. I | none/0.4 parts |
| | Costab. II | none/0.3 parts |
| | Costab. III | none/1.0 parts |
| Costab. I: | Malbit CH 16385 = | maltitol |
| Costab. II: | Mark 6045 J = | 60% strength NaClO$_4$ solution absorbed on CaSiO$_3$—CaCO$_3$ |
| Costab. III: = | | Ca Al hydroxide or aluminum hydroxide |

TABLE 1

| Formulation No. | Costab. I | Costab. II | Costab. III | Notes |
|---|---|---|---|---|
| 1 | − | − | − | prior art |
| 2 | − | − | A-1[1] | inventive |
| 3 | + | − | " | " |
| 4 | − | − | A-2[2] | " |
| 5 | + | − | " | " |
| 6 | + | + | " | " |
| 7 | − | − | 512/138[3] | " |
| 8 | + | − | " | " |
| 9 | − | − | Al(OH)$_3$[4] | " |
| 10 | + | − | " | " |
| 11 | + | + | " | " |
| 12 | + | − | A-3[5] | " |
| 13 | + | + | " | " |
| 14 | + | − | 1385/091/A[6] | " |
| 15 | + | + | " | " |
| 16 | + | − | 1385/093/A[7] | " |
| 17 | + | + | " | " |

[1] Apyral C3AH6 - katoite
[2] Apyral 180: AlO(OH) - boehmite
[3] Ca Al hydroxy hydrogen phosphite (from DE 3 941 902, Example 2, but no Na stearate coating)
[4] ex Merck
[5] Apyral 120: Al(OH)$_3$ - hydrargillite (gibbsite)
[6] synthetic katoite (ex WO 93/25613, Example 1)
[7] synthetic hydrocalumite (ex WO 92/13914, Example 1)

TABLE 2

| Formulation No. | Minutes | | | | | | | | |
|---|---|---|---|---|---|---|---|---|---|
| | 0 | 3 | 6 | 9 | 12 | 15 | 18 | 21 | 24 |
| 1 | 64.7 | 71.4 | 102.1 | black | — | — | — | — | — |
| 2 | 46.3 | 47.5 | 62.1 | 94.7 | black | — | — | — | — |
| 3 | 28.0 | 29.9 | 32.6 | 41.4 | 51.3 | 70.6 | 112.5 | black | — |
| 4 | 50.0 | 54.3 | 72.2 | 108.8 | black | — | — | — | — |
| 5 | 40.0 | 40.6 | 41.9 | 44.6 | 51.5 | 77.6 | black | — | — |
| 6 | 27.9 | 28.5 | 29.0 | 31.4 | 42.2 | 48.1 | 61.3 | 73.4 | 91.1[β] |
| 7 | 50.4 | 57.0 | 75.6 | 111.5 | black | — | — | — | — |
| 8 | 30.7 | 32.6 | 37.0 | 49.0 | 71.4 | 115.1 | black | — | — |
| 9 | 39.0 | 50.4 | 80.1 | 91.5 | black | — | — | — | — |
| 10 | 31.4 | 33.1 | 39.5 | 52.9 | 89.6 | black | — | — | — |
| 11 | 27.9 | 28.2 | 32.2 | 44.1 | 52.4 | 62.1 | 74.5 | 93.1 | 120.0[α] |
| 12 | 35.8 | 35.8 | 36.5 | 39.4 | 55.8 | 80.6 | 102.7 | black | — |
| 13 | 27.9 | 29.6 | 29.8 | 31.2 | 37.4 | 42.5 | 53.0 | 67.1 | 79.3[β] |
| 14 | 35.0 | 35.5 | 36.1 | 37.6 | 43.2 | 62.0 | black | — | — |
| 15 | 28.2 | 28.5 | 29.6 | 32.6 | 41.4 | 46.0 | 57.8 | 71.1 | 89.5[β] |
| 16 | 32.9 | 34.2 | 35.1 | 37.4 | 41.2 | 51.2 | 79.8 | black | — |
| 17 | 27.6 | 28.6 | 28.6 | 29.6 | 37.0 | 47.9 | 51.7 | 67.2 | 84.5[β] |

[α] slow color change to brown within 48 minutes
[β] slow color change to brown within 93 minutes The experiment clearly shows that the stabilizer combinations according to the invention are improved relative to the prior art both in initial color and color attention (mid-color)—YI measurements—and in long-term stability—measurement: time to blackening.

What is claimed is:

1. A stabilizer combination comprising
A) at least one compound of the formula I

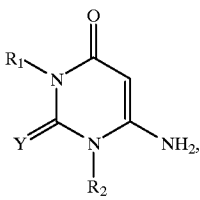

in which
R$_1$ and R$_2$ independently of one another are C$_1$–C$_{12}$-alkyl, C$_3$–C$_6$-alkenyl, C$_5$–C$_8$-cycloalkyl which is unsubstituted or substituted by 1 to 3 C$_1$–C$_4$-alkyl-, C$_1$–C$_4$-alkoxy-, C$_5$–C$_8$-cycloalkyl or hydroxyl groups or chlorine atoms, or are C$_7$–C$_9$-phenylalkyl which is unsubstituted or substituted on the phenyl ring by 1 to 3 C$_1$–C$_4$-alkyl, C$_1$–C$_4$-alkoxy, C$_5$–C$_8$-cycloalkyl or hydroxyl groups or chlorine atoms, and
R$_1$ or R$_2$ can additionally be hydrogen, and
Y is S or O, and
B) at least one compound from the group of the calcium aluminum hydroxides and/or their hydrates and/or
C) at least one compound from the group of the calcium aluminum hydrogen phosphites and/or their hydrates and/or
D) at least one compound of the group of the aluminum hydroxides and/or their hydrates and/or
E) at least one compound from the group of the calcium aluminum hydroxo (hydrogen) carbonates and/or their hydrates and/or
F) at least one compound from the group of the lithium layered lattice compounds and/or their hydrates and/or
G) at least one compound from the group of the titanium-containing hydrotalcites and/or their hydrates.

2. The stabilizer combination as claimed in claim 1, in which component B) is a compound from the group of hydrocalumites of the general formula $$Ca_xAl(OH)_{2x+3} \cdot mH_2O,$$

where
x=1–4 and
m=0–8.
or of the group of katoites of the general formula $$Ca_3Al_2(OH)_{12} \cdot mH_2O \text{ or } Ca_3Al_2(OH)_{10}X_2 \cdot mH_2O \text{ or } Ca_3Al_2(OH)_{10}Y \cdot mH_2O$$

m=0–10; X=monovalent and Y=divalent inorganic or organic anion.

3. The stabilizer combination as claimed in claim 1, in which component C) is a compound from the group of calcium aluminum hydroxo hydrogen phosphites of the general formula $$Ca_xAl_2(OH)_{2(x+2)}HPO_3 \cdot mH_2O,$$

where
x=2–8 and
m=0–12.

4. The stabilizer combination as claimed in claim 1, in which component F) is a compound from the group of lithium aluminum layered lattice compounds of the general formula A $$Li_aM''_{(b-2a)}Al_{(2+a)}OH_{(4+2b)}A^{n-}_{2/n} \cdot mH_2O$$

in which
$M''$ is Mg, Ca or Zn and
$A^{n-}$ is a selected anion of valency n or a mixture of anions, and the indices lie in the range
$0<a<(b-2)/2$,
$1<b<6$ and
m=0 to 30
with the proviso that $b-2a>2$,
or have the general formula B $$[Al_2(Li_{(1-x)} \cdot M''_x)(OH)_6]_n(A^{n-})_{1+x} \cdot mH_2O$$

in which $M''$, A, m and n are as defined above and
for x the condition $0.01 \leq x < 1$ is met.

5. The stabilizer combination as claimed in claim 1, in which component G) is a titanium-containing hydrotalcite of the formula $$Al_aMg_bTi_c(OH)_d(CO_3)_e \cdot mH_2O$$

where a:b=1:1 to 1:10; $2 \leq b \leq 10$; $0<c<5$; $0 \leq m<5$ and d and e are chosen such that a basic, charge-free molecule is formed.

6. The stabilizer combination as claimed in claim 1, in which the compound A) of formula I is
6-amino-1,3-dimethyluracil, 6-amino-1,3-di-n-propyluracil,
6-amino-1,3-di-n-butyluracil, 6-amino-1,3-diethylthiouracil or
6-amino-1,3-di-n-butylthiouracil, 6-amino-1,3-diethyluracil.

7. The stabilizer combination as claimed in any of claims 1 to 6, which additionally comprises at least one epoxidized fatty acid ester or glycidyl compound with or without perchlorate compound with or without zinc carboxylates and/or alkali metal carboxylates and/or alkaline earth metal carboxylates or aluminum carboxylates with or without at least one further substance from the group of phosphites, antioxidants, beta-dicarbonyl compounds, plasticizers, fillers, lubricants or pigments.

8. The stabilizer combination as claimed in any of claims 1 to 6, additionally comprising a polyol and/or a disaccharide alcohol with or without a glycidyl compound with or without a perchlorate compound.

9. The composition comprising a chlorine-containing polymer and at least one stabilizer combination as claimed in any of claims 1 to 8.

10. The stabilizer combination as claimed in claim 9 for producing PVC pipes or for producing PVC profiles.

11. The stabilizer combination as claimed in any of claims 1 to 6 which additionally comprises a perchlorate compound with or without alkalimetalcarboxylates with or without alkaline earth metal carboxylates or aluminium carboxylates with or without at least one further substance from the group of phosphites, antioxidants, beta-dicarbonylcompounds, plasticizers, fillers, lubricants or pigments.

* * * * *